United States Patent

[11] 3,539,141

| [72] | Inventor | Rolf Mowatt-Larssen<br>Kinnelon, New Jersey |
|---|---|---|
| [21] | Appl. No. | 701,656 |
| [22] | Filed | Jan. 30, 1968 |
| [45] | Patented | Nov. 10, 1970 |
| [73] | Assignee | Magor Railcar Division, Fruehauf<br>Corporation<br>Clifton, New Jersey<br>a corporation of Michigan |

[54] TRAILER HITCH
8 Claims, 25 Drawing Figs.

[52] U.S. Cl. ........................................ 248/119,
  105/368
[51] Int. Cl. ...................................... B60p 7/08
[50] Field of Search .............................. 248/119(S),
  119; 105/368(S), 368; 280/437

[56] References Cited
UNITED STATES PATENTS

| 3,041,028 | 6/1962 | McDowell | 248/119(S) |
|---|---|---|---|
| 3,143,978 | 8/1964 | Clejan | 248/119(S) |
| 3,168,878 | 2/1965 | Clejan | 248/119(S) |
| 3,183,853 | 5/1965 | Terlecky et al. | 248/119(S) |
| 3,185,421 | 5/1965 | Ferris | 248/119(S) |
| 3,228,641 | 1/1966 | Ferris | 248/119(S) |
| 3,252,432 | 5/1966 | Hartzell | 248/119(S) |
| 3,358,955 | 12/1967 | Wille et al. | 248/119(S) |
| 2,610,069 | 9/1952 | Ketel | 248/119UX |
| 2,835,209 | 5/1958 | Kavanaugh | 248/119UX |
| 3,358,954 | 12/1967 | Smith et al. | 248/119(S)UX |

*Primary Examiner*—Francis K. Zugel
*Attorney*—Imirie, Smiley, Snyder and Butrum

ABSTRACT: A collapsible hitch is provided for mounting on a suitable support surface. The hitch may be raised to erected operative position for receiving a kingpin of a trailer and for supporting a trailer thereon. Means is provided for automatically locking the kingpin in place, and this locking means may be released by a tractor, or in a modified form of the invention the locking means may be manually released. The hitch may be collapsed to substantially flat relationship on the supporting surface so as not to present a substantial obstruction thereon so that the surface can be used for other purposes.

INVENTOR.
Rolf Mowatt-Larssen
BY Bryan and Butrum
ATTORNEYS 3,539,141

TRAILER HITCH

BACKGROUND OF THE INVENTION

The present invention relates to a hitch which is adapted to be mounted for example on a railway car or the like wherein the railway car is to be used in so-called "piggyback" operations wherein trailer bodies are supported on the railcar by the collapsible hitch of the present invention. The hitches may be collapsed flat on a car so that the cars may be employed for other purposes and so that trailers may readily move thereover, and when desired, the hitches may be moved into erected operative position for supporting a trailer thereon.

Collapsible hitches for railcars have been employed in different forms in the prior art, and typical examples of known arrangements are shown in U.S. Pat. Nos. 3,143,978; 3,168,878; 3,183,853 and 3,185,421.

Such prior art trailer hitches have a number of disadvantages. These arrangements are of such a construction that a two-point support is provided wherein a pair of vertical members serve to support the load, and inclined members are provided for holding the structure in erected position. Such constructions have been subject to structural failure due to overloading of certain members thereof.

Prior art hitches have also been relatively heavy and cumbersome and accordingly are relatively expensive. Due to such construction, an associated tractor is often unduly loaded and strained during the loading operation of moving a trailer into operative position upon an erected hitch.

A further disadvantage of these bulky prior art arrangements is the fact that they do not have a low profile, and the heavy members thereof extend up an undue distance from the associated supporting surface.

Additionally, hitch constructions now in use employ a relatively narrow spacing of the support members at the base thereof, and during collapsing movement of the hitches, the members of such constructions have an excessive reward component of movement. This excessive movement of the prior art hitches in a fore and aft direction has a tendency to damage the kingpin support structure and it also tends to damage transverse members of the trailer.

A further problem encountered with presently employed structures is the fact that the kingpin locking mechanism does not latch properly and may release accidentally, thereby creating a serious problem.

SUMMARY OF THE INVENTION

In the present invention, a support means which receives the kingpin and supports the forward end of a trailer is pivotally connected with a pair of front legs and a pair of rear legs, each of the rear legs comprising a pair of pivotally interconnected leg sections. The support means is accordingly provided with a four-point support so as to substantially eliminate any overloading of particular support members.

The overall arrangement of the present invention is such that it is not necessary to employ as heavy members as employed in the prior art, thereby reducing the expense and size of the construction and providing a very low profile when the apparatus is in collapsed position. Additionally, a boarder base is incorporated in the construction than as is the case with known arrangements.

The rearward angular slope of the front legs in combination with the pivoted section arrangement of the rear legs enables the hitch to drop downwardly rapidly when the rear leg sections are collapsed, with the upper sections folding over the lower rearwardly pivoting sections. This initial rapid drop of the support means prevents damage to transverse members of the associated trailer.

Plate means is pivotally interconnected with the front legs and is interconnected with a link system so as to retain the plate means and the support means in generally horizontal relationship in various positions of the structure.

Actuating means is provided for enabling a tractor to automatically release the kingpin locking means when desired, and additionally a manually operated release means is provided in one form of the invention which is particularly useful when conducting overhead crane operations.

Resilient means is provided in the present invention for normally urging the kingpin lock means into its locked position so that it is positively held in its locked position until released, thereby preventing accidental release of the kingpin. When it is desired to release the kingpin, the kingpin lock mechanism may be readily moved to its retracted position so as to enable the kingpin to be effectively released from the apparatus.

DESCRIPTION OF THE PREFERRED EMBODIMENTS

Referring now to the drawings wherein like reference characters designate corresponding parts throughout, two front supporting feet 11 and two rear supporting feet 12 may be bolted, welded or otherwise secured to a deck, floor or other surface or may be welded to a plate such as plate 13, which may be secured to a supporting surface on a railcar, for example. Each of the feet 11, 12 embody spaced plates 14 secured together by a plate 15 which is welded therebetween.

Figure 1:
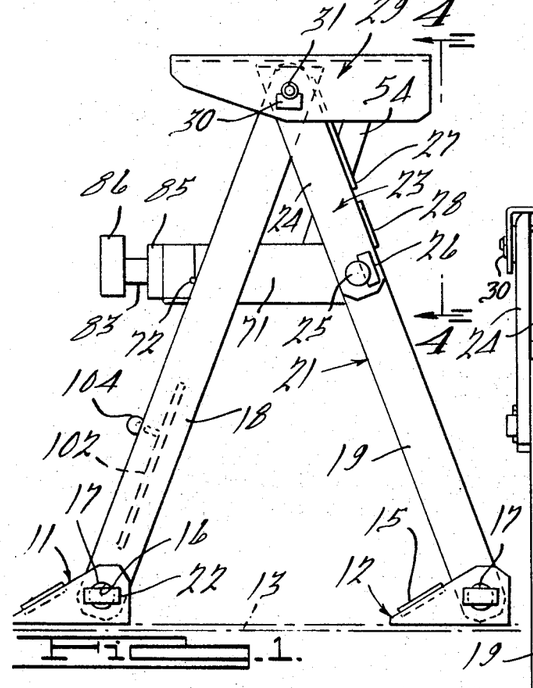
FIG. 1 is a vertical side view of the hitch of the present invention in raised, operable position.
Figure 2:
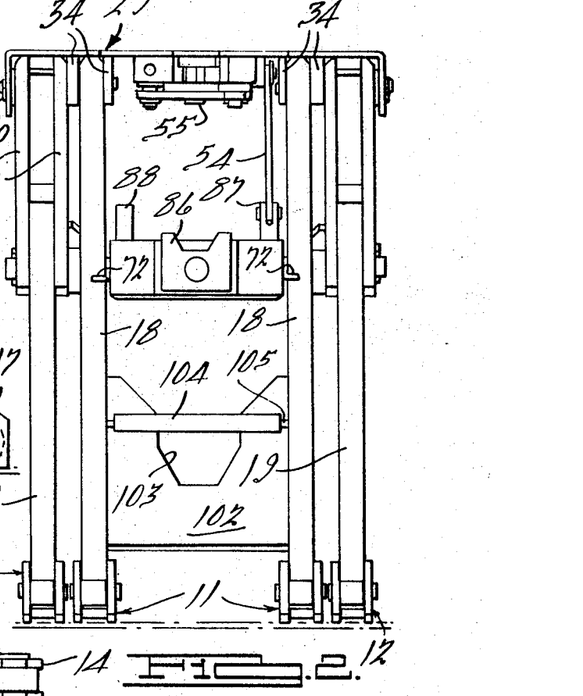
FIG. 2 is a front view of the hitch illustrated in FIG. 1, as viewed from the left-hand side thereof.
Figure 3:
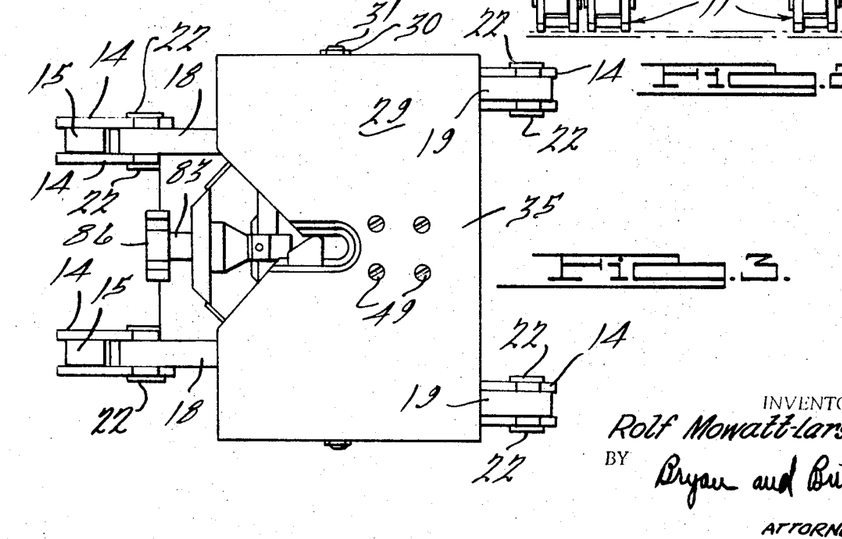
FIG. 3 is a top plan view of the hitch illustrated in FIG. 1.

Aligned apertures 16 through the plates receive a pivot pin 17 on which a pair of front legs 18 and bottom sections 19 of a pair of rear legs 21 are pivoted. The pins are retained within the apertures by plates 22 which are welded thereacross to the plates 14. The front legs 18 and the bottom sections 19 of the rear legs 21 are made of rectangular bar stock while upper sections 23 of the rear legs are made from two plates 24 joined together by a plate 27. The plates 24 engage the sides of the bottom sections 19 and are secured thereto by a pin 25. The pin has a slot in the outer wall portion which is engaged by a plate 26 welded to an outer plate 24 to prevent the pin from shifting. The top of the bottom sections 19 has a plate 28 welded thereto which engages the two plates 24 of the top sections 23 when the sections are disposed in aligned relation, as illustrated in FIG. 1.

Figure 6:
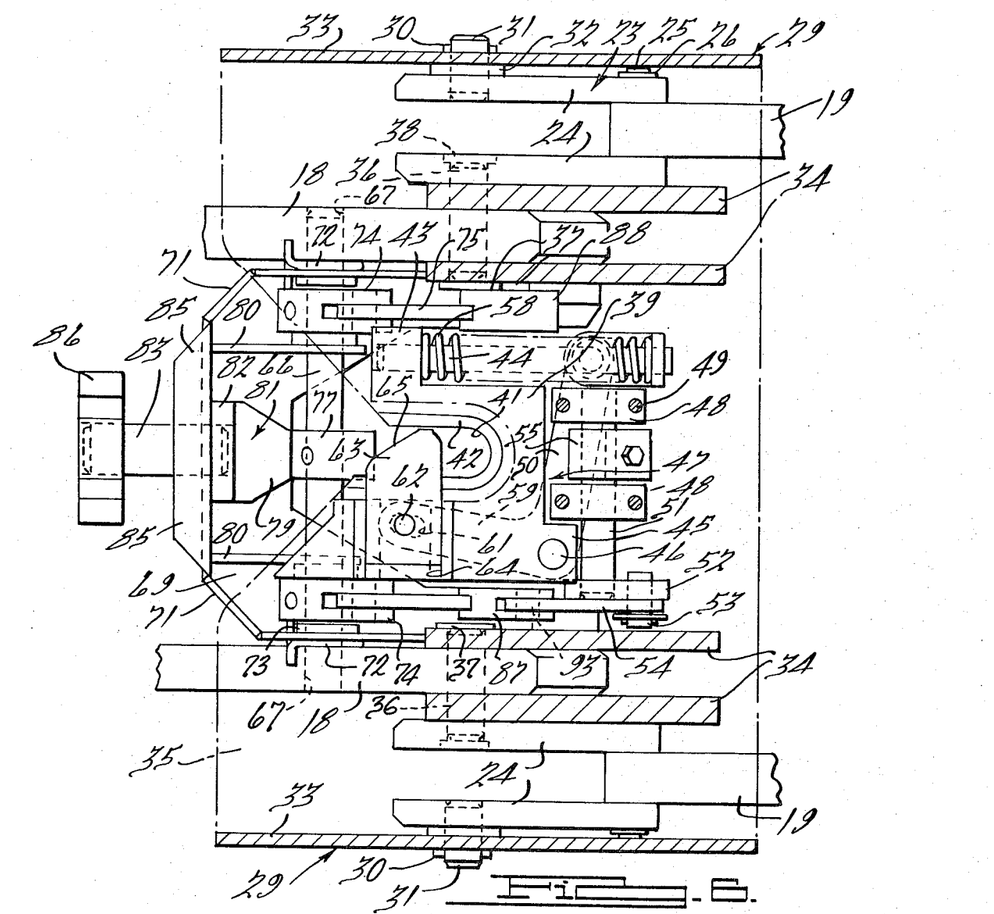
FIG. 6 is a sectional view of the structure illustrated in FIG. 5, taken on the line 6-6 thereof.

A support means includes a fifth wheel 29 which is secured to the top of the front and rear legs 18 and 21, as more clearly illustrated in FIG. 6. Each of the outer plates 24 is secured to a pivot pin 31 which has a washer 32 thereon for spacing the plate from the side wall 33 of the fifth wheel. Each of the pivot pins 31 extends through one of the walls 33 of the fifth wheel and has a slot in which a plate 30 is disposed, plate 30 being welded to the wall 33 for securing the associated pivot pin against outward and inward movement. The inner plate 24 is pivoted to the adjacent of a pair of spaced hangers 34 extending downwardly from a top 35 of the fifth wheel 29. Each of the front legs 18 is disposed between a pair of hangers 34. Aligned apertures in the inner plates 24, the hangers 34 and legs 18 receive pivot pins 36 which are retained in position by plates 37 welded over the apertures through the innermost hangers 34 and by a plate 38 which is tack welded in the enlarged ends of apertures through the innermost plates 24. With this arrangement the leg sections 18 can fold between the plates 24 of each leg section 23 when the hitch is in collapsed position.

Figure 9:
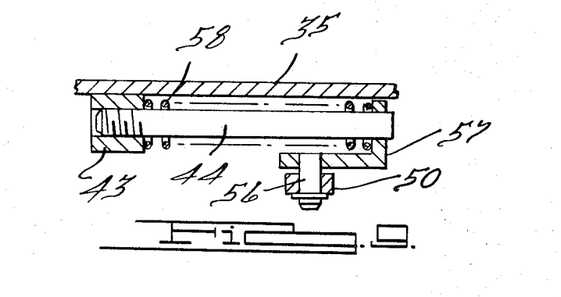
FIG. 9 is a sectional view of the structure illustrated in FIG. 4, taken on the line 9-9 thereof.

Centrally on the underside of the top 35 of the fifth wheel 29, the support means also includes a block 39 which is secured as by welding, this block having a kingpin receiving aperture or slot 41 provided with a shoulder 42 for receiving the head of the kingpin. The block 39 has a boss 43 in which a rod 44 is threaded to extend outwardly thereof. The block also has a boss 45 which supports a pivot pin 46 on which a bellcrank 47 is pivoted. A pair of brackets 48 are secured to the top 35 by bolts 49. The brackets support a shaft 51, the extending end of which supports an arm 52 connected at the end thereof by a pin 53 to a link 54. Between the brackets 48 a cam arm 55 is secured on the shaft 51 in position to engage an arm 50 of the bellcrank for rotating it counterclockwise, as viewed in FIG. 6. The end of the arm 50 is secured by a pin 56 to an L-shaped bracket 57 which is slidable on the rod 44, as illustrated in FIG. 9. A spring 58 is disposed on the rod between the boss 43 and end of the bracket 57 for moving the bellcrank 47 clockwise as seen in FIG. 6 when released by the cam arm 55.

An arm 59 of the bellcrank 47 has a slot 61 therein which receives a pin 62 supported by a slidable kingpin locking bar 63. The locking bar slides in a shoulder slot 64 in the block 39 in which the pin 62 can also advance. The locking bar has a cam surface 65 on the front end which, when engaged by the kingpin being inserted into the slot 41, will automatically retract the bar and permit the pin to enter the kingpin slot. The spring 58 urges the bellcrank 47 clockwise and moves the locking bar to locked position after the kingpin has passed therebeyond.

Figure 5:
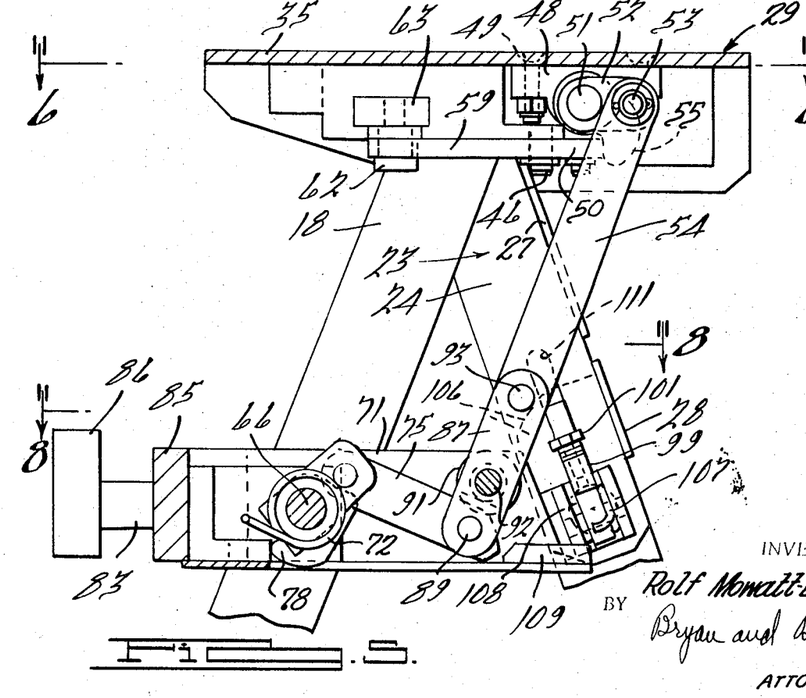
FIG. 5 is a sectional view of the structure illustrated in FIG. 4, taken on the line 5-5 thereof.
Figure 7:
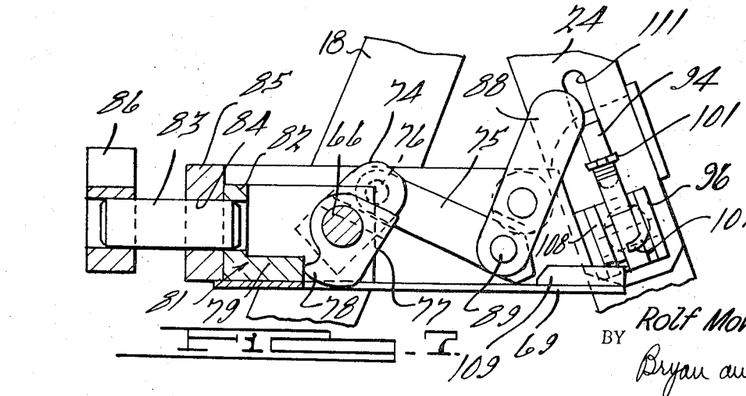
FIG. 7 is a broken sectional view of the structure illustrated in FIG. 4, taken on the line 7-7 thereof.
Figure 8:
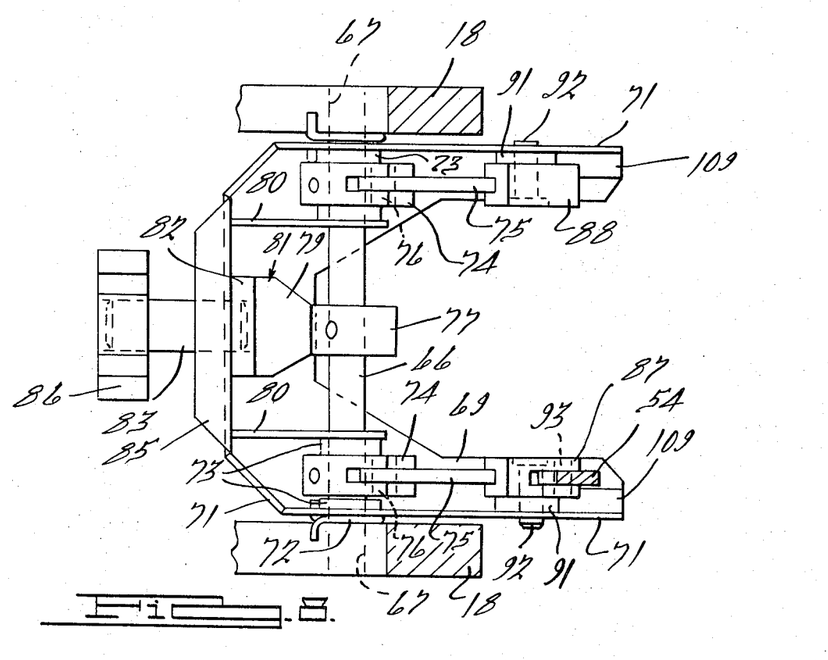
FIG. 8 is a sectional view of the structure illustrated in FIG. 5, taken on the line 8-8 thereof.

A shaft 66 is mounted in apertures 67 on the two front legs 18 for supporting a plate means 69 having side flanges 71 through which the shaft 66 extends. Torsion springs 72 have one arm engaging the leg 18 and the other arm extending through an aperture in the flange 71 for biasing the plate means 69 in a clockwise direction as seen in FIGS. 5 and 7. A pair of washers 73 on shaft 66 engage the inner faces of the flanges 71. Spaced arms 74 are fixed to the shaft 66 adjacent to the washers 73, said arms having slotted ends which receive links 75 secured thereto by pivot pins 76. A cam arm 77 is secured to the center of shaft 66 and has a cam finger 78 engageable by an end of an arm 79 of an actuating element 81. A vertical arm 82 of the actuating element 81 is carried on the forward end of a plunger 83 which slides through an aperture 84 in a block 85 secured to the plate 69 and the edges of the side flanges 71. A head 86 is attached to the outer end of the plunger 83 for engagement by a tractor.

A pair of ribs 80 are mounted on the plate 69 through which the shaft 66 extends providing inboard support therefor. The links 75 are joined to a pair of levers 87 and 88 by pivot pins 89. The levers are spaced from the flange 71 by washers 91 and are secured thereto by pivot pins 92 which extend through the washers. The lever 87 is secured to the link 54 by a pivot pin 93. The link 54 is disposed substantially in parallel relation to front legs 18 and forms a parallelogram relationship therewith and with the fifth wheel 29 and the plate 69 so that both the fifth wheel and plate will remain parallel to each other in substantially horizontal planes in all positions of the hitch.

Figure 4:
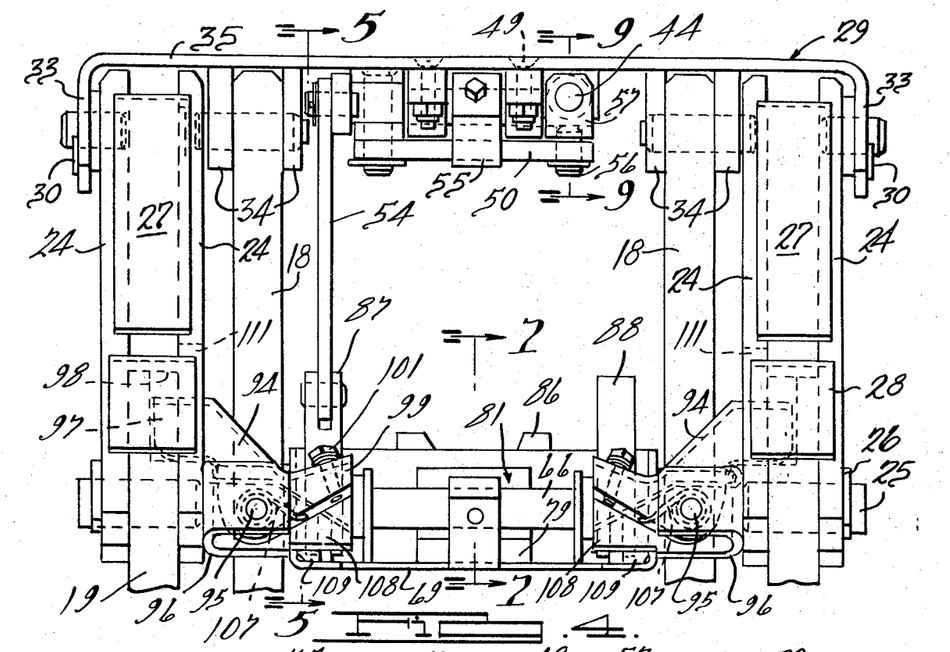
FIG. 4 is an enlarged broken view of the structure illustrated in FIG. 1, as viewed from the line 4-4 thereof.

As seen in FIG. 4, locking fingers 94 are secured by pivot pins 95 in U-shaped brackets 96 secured to the pins 25 of the rear legs. Locking ends 97 of the fingers extend into slots 98 in the inner side of the lower rear leg sections 19 and securely lock the rear leg sections 19 and 23 in fixed relation to each other. Arms 99 on the locking fingers 94 support screws 101 the heads of which are disposed in aligned relation with the levers 87 and 88. The levers engage the screw heads when moved clockwise as seen in FIGS. 5 and 7 for moving the fingers 94 upwardly and the ends 97 out of the slots 98.

When the head 86 is moved toward the block 85, the shaft 66 is rotated counterclockwise as seen in FIGS. 5 and 7 along with the arms 74, moving the links 75 forwardly and rotating the levers 87 and 88 clockwise as seen in FIG. 5. This pulls the link 54 downwardly rotating the shaft 51 so that the cam arm 55 moves the bellcrank 47 counterclockwise as seen in FIG. 6 to thereby withdraw the locking bar 63 and release the kingpin in the slot 41. At the same time, the levers 87 and 88 strike the head of the screws 101 deflecting the arms 99 and withdrawing the locking ends 97 from the slots 98. A further movement of the head 86 breaks the rear leg sections 19 and 23 and permits the hitch to drop by gravity from the position illustrated in FIG. 1 to the nested position illustrated in FIG. 10. During the downward movement, spring 58 rotates the bellcrank 47 clockwise returning the latching bar 63 to latch position and moving the levers, arms, links and the head 86 to their initial positions, as illustrated in FIG. 7. The front legs 18 are interconnected at the lower ends by a plate 102 having a cutout portion 103 which is bridged by a bar 104 secured thereon by ribs 105.

Figure 10:
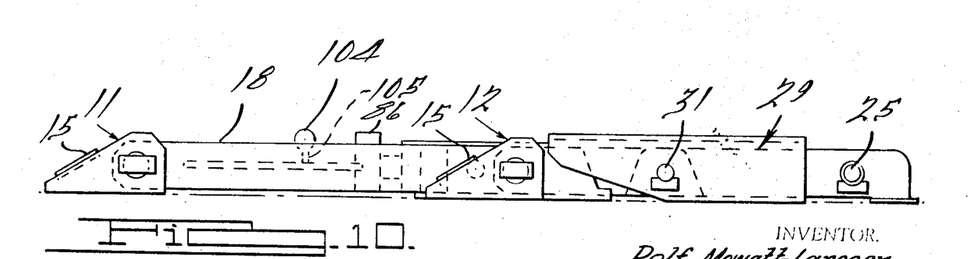
FIG. 10 is a view of the structure illustrated in FIG. 1, shown in collapsed position.

When the trailer hitch is in collapsed position, as illustrated in FIG. 10, a hook on the tractor is moved to engage the bar 104. When the tractor is driven forwardly the front legs are pulled upwardly and forwardly along with the fifth wheel 29 and the plate 69 which raises the leg sections 23 and 19 along their length. As the legs open outwardly toward extended position, the forward faces of the leg sections 19 strike the transverse arcuate end of the locking ends 97 of the locking fingers 94 and swings the fingers toward the center of the hitch. The ends ride along an arcuate portion 106 on the upper end of the leg sections 19 until the leg sections are in aligned relation. This occurs when the stop plates 28 engage the plates 24 of the upper leg sections 23, whereupon the locking ends 97 of fingers 94 will be moved downwardly into the slots 98 by the tension of torsion springs 107.

The forward side of each U-shaped bracket 96 has an extending finger 108, as illustrated in FIG. 4, which engages a block 109 at the rear corners of the plate means 69. This accurately locates the plate means 69 in horizontal position and through the link system maintains the fifth wheel 29 in the like horizontal position. The locking fingers 94 extend through a slot 111 in the inner of the plates 24 forming the rear upper legs section 23 in position to be moved inwardly and outwardly of the slot 98.

Figure 11:
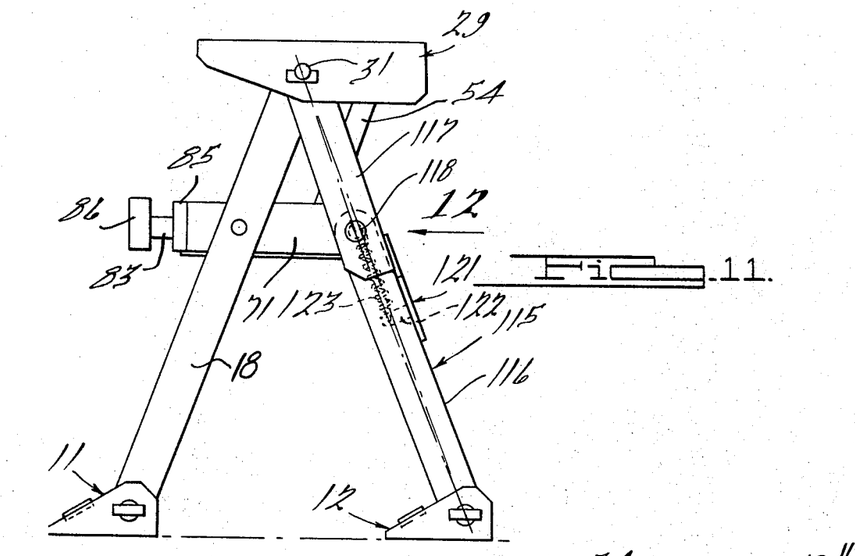
FIG. 11 is a view of structure, similar to that illustrated in FIG. 1, showing another form of the invention.
Figure 12:
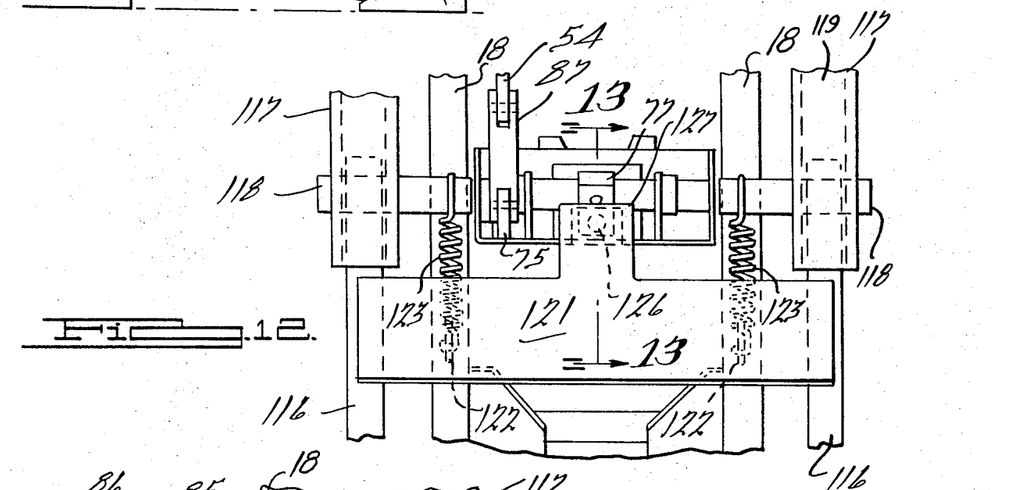
FIG. 12 is a broken, enlarged view of the structure illustrated in FIG. 1, as viewed from the point 12 thereof.
Figure 13:
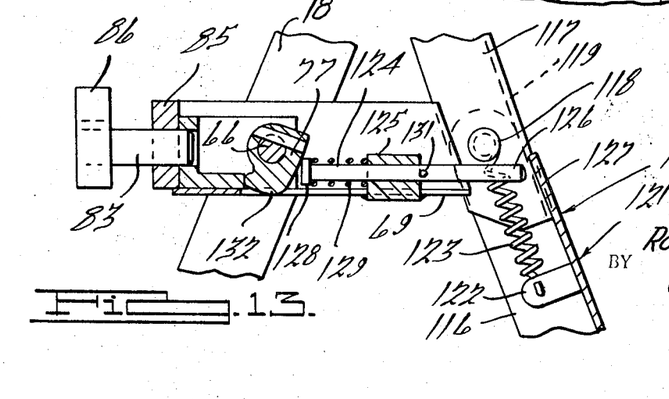
FIG. 13 is a sectional view of the structure illustrated in FIG. 12, taken on the line 13-13 thereof.

Referring to FIGS. 11, 12 and 13, a further form of hitch is illustrated wherein a rear leg 115 has bottom sections 116 secured to top sections 117 by pivot pins 118. The upper sections 117 are each of U-shape, a web 119 of which strikes the rear face of the associated bottom leg portion 116 when in overcenter relation to each other. A plate 121 is secured between the bottom leg sections 116 and is provided with inwardly extending fingers 122 to which the lower end of springs 123 are secured. The opposite end of the springs are secured to the pivot pins 118, to provide a force opposing the movement of the leg sections 116 and 117 from toggle position.

To collapse the legs, a rod 124 is mounted on the plate 69 in a boss 125 with its rearward end 126 located adjacent to an extending flange 127 of the plate 121. The opposite end of the rod 124 has a head 128 which is urged by a spring 129 located about the rod and between the boss 125 and head 128 toward the cam element 77, the rod 124 being limited in its forward movement by a pin 131. When the head 86 is struck by a tractor, the end 126 of the rod 124 will engage the flange 127 and move the bottom sections 116 of the rear legs rearwardly to move the pivot 118 from toggle position so that the rear legs 115 will collapse. The structure of the hitch is otherwise the same as that of FIGS. 1 to 10 so that upon initial movement of the head 86, the locking bar 63 will be released, and thereafter the rear legs will be collapsed when the head 128 is engaged by an extending portion 132 of the arm element 77. The use of the spring 123 for applying a force to the pivot 118 when in toggle position prevents the toggle from being broken in the presence of shock.

Figure 14:
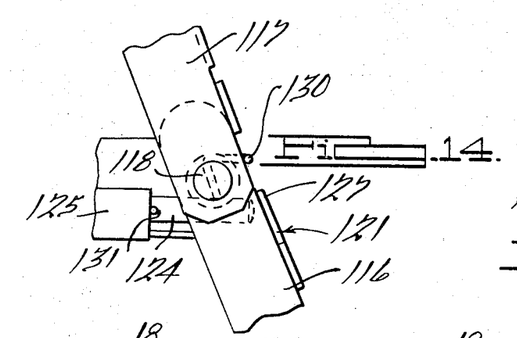
FIG. 14 is a view of the structure illustrated in FIG. 13, with a torsion spring substituted for the tension spring.

In FIG. 14, similar construction is illustrated with the exception that torsion springs 130 are substituted for the tension springs 123. The torsion springs have one end fixed to the pivots 118 and the other end engaging the rear leg sections 116 to provide the bias to the leg sections 116 and 117 to retain them in toggle position.

Figure 15:
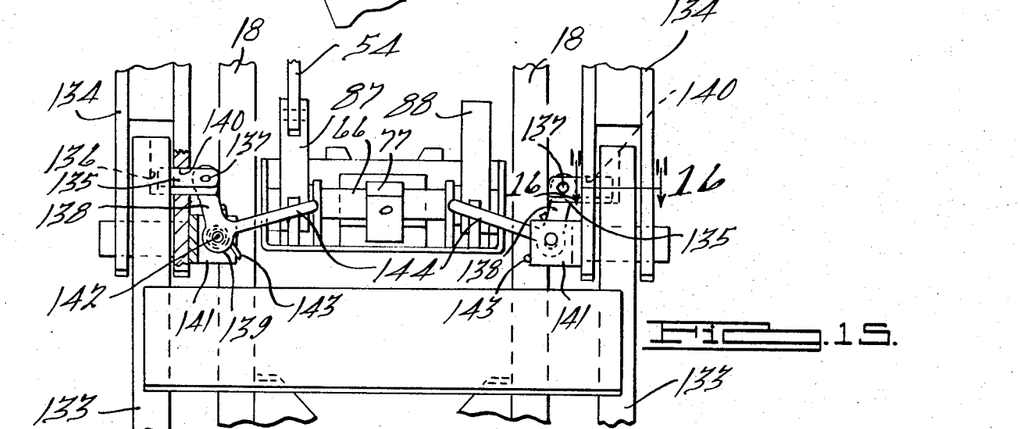
FIG. 15 is a view of structure, similar to that illustrated in FIG. 12, showing another form of the invention.
Figure 16:
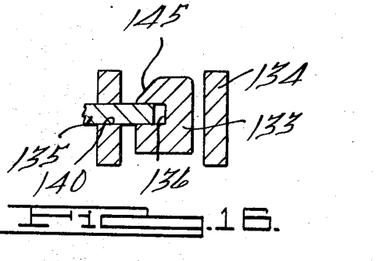
FIG. 16 is a sectional view of the structure illustrated in FIG. 14, taken on the line 15-15 thereof.

Referring to FIGS. 15 and 16, a still further form of a locking mechanism for the hitch is illustrated, wherein the rear leg sections 133 and 134 are secured against collapse by a shot pin 135 extending into a slot 136 at the end of the leg sections 133. The shot pin 135 is supported in an aperture 140 in the flange of the upper leg sections 134 and is secured by a pin 137 to an arm 138 on a boss 139 disposed in a slot in a bracket 141. The bracket is supported on the inner flange of the upper leg sections 134 below the apertures 140 by a pivot pin 142. A torsion spring 143 is disposed about the pivot pins 142 with the ends engaging the bracket 141 and the arm 138 for urging the shot pin 135 toward the leg sections 133.

An arm 144 extends from each of the bosses 139 in position to be engaged by levers 87 and 88 when moved clockwise upon the rearward movement of the head 86 as pointed out hereinabove. This retracts the shot pins 135 and permits the rear legs to collapse. When moving the hitch to raised position, cam surfaces 145 on the inward upper edges of the leg sections 133 will engage the inner end of the shot pins 135 and move them to retracted position from which they will advance into the slots 136 when the leg sections 116 and 117 are in extension of each other. Otherwise, the construction of the hitch is the same as that illustrated in FIGS. 1 to 10.

Figure 17:
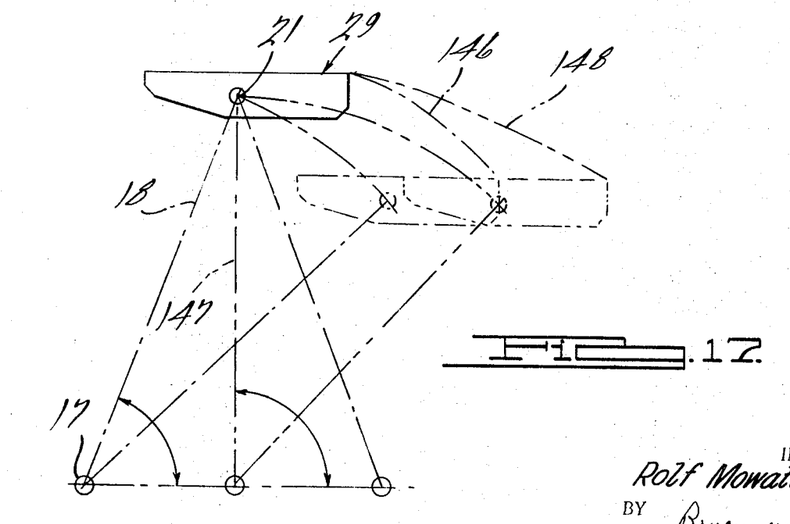
FIG. 17 is a diagrammatical view of the hitch showing the collapsing movement of the fifth wheel as compared to one mounted on a vertical support.

One advantage of the hitch of the present invention is illustrated in FIG. 17. The fifth wheel 29 drops downwardly a substantial amount immediately upon its rearward movement. This reduces the chance of the fifth wheel striking members beneath the trailer floor which could cause damage thereto as well as to the hitch. It will be noted that the rear end of the fifth wheel drops downwardly upon an arcuate line 146 and when the fifth wheel is supported on a vertical leg 147, the rear end will have a substantial horizontal component of rearward movement as it moves along the arcuate line 148. By having the front leg disposed at an angle, a substantial amount of the horizontal component of movement is eliminated and the possiblity of damaging the trailer under structure or the hitch is substantially reduced.

Referring now to FIGS. 18—25 inclusive, a further modified form of the invention is illustrated. The trailer hitch is of substantially the same construction as that previously described, the supporting leg structure being for example substantially identical with that discussed in connection with the modification shown in FIGS. 1—10 inclusive, and similar parts have been given the same reference numerals primed. The fifth wheel 29' is substantially identical to that previously described. The support means in this form of the invention includes a support portion indicated generally by reference numeral 150 which replaces the block 39 of the previously described modification.

Portion 150 of the support means may comprise a casting or other construction which is suitably secured as by welding to the undersurface of the fifth wheel. Portion 150 includes a kingpin receiving slot 154, this slot having a shoulder portion 154 formed therein for supporting a part of the kingpin. The slot in the portion 150 is disposed below and substantially in line with a corresponding slot 156 formed in the fifth wheel.

Figure 18:
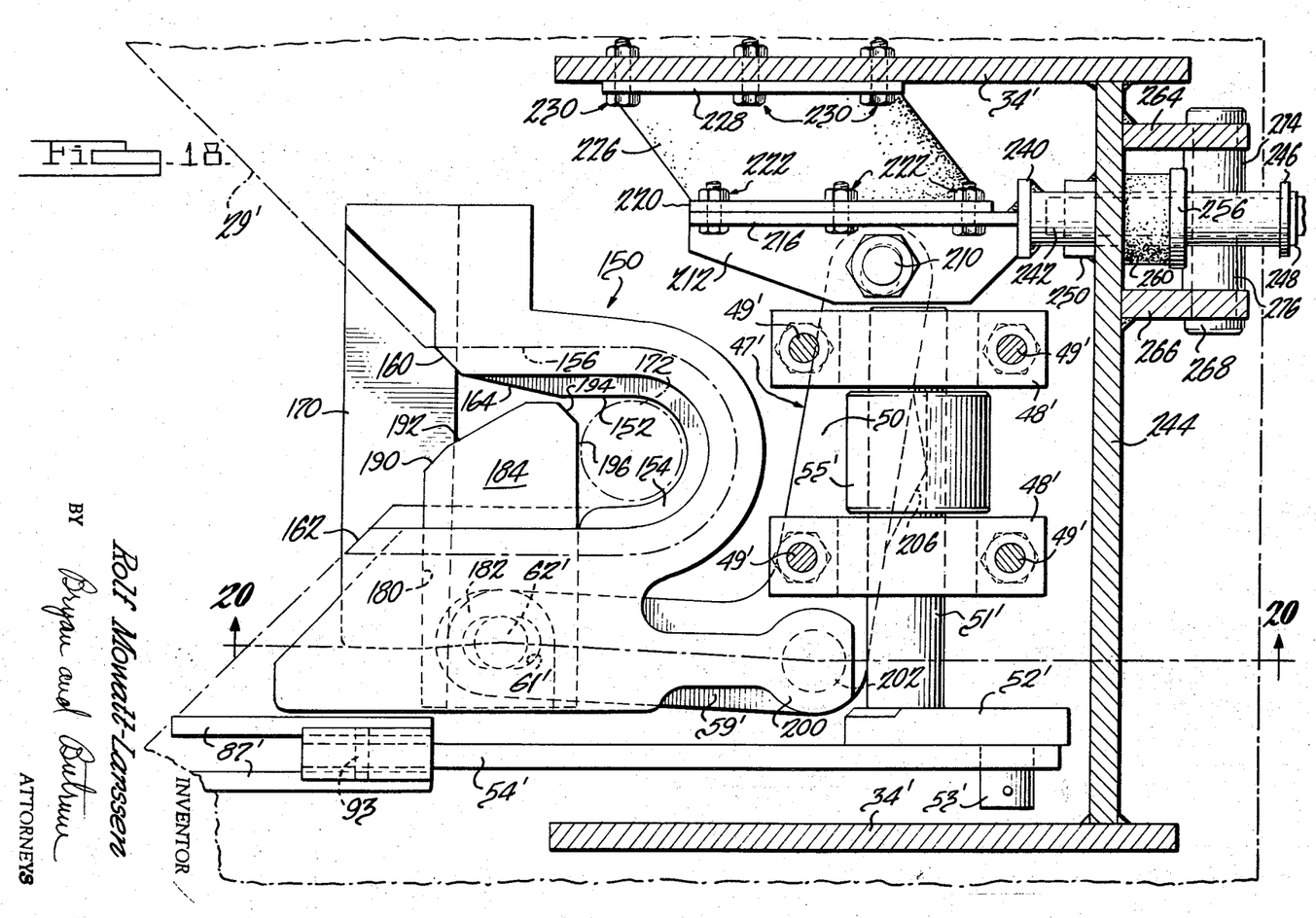
FIG. 18 is a view similar to FIG. 6 of a modified form of the invention.
Figure 24:
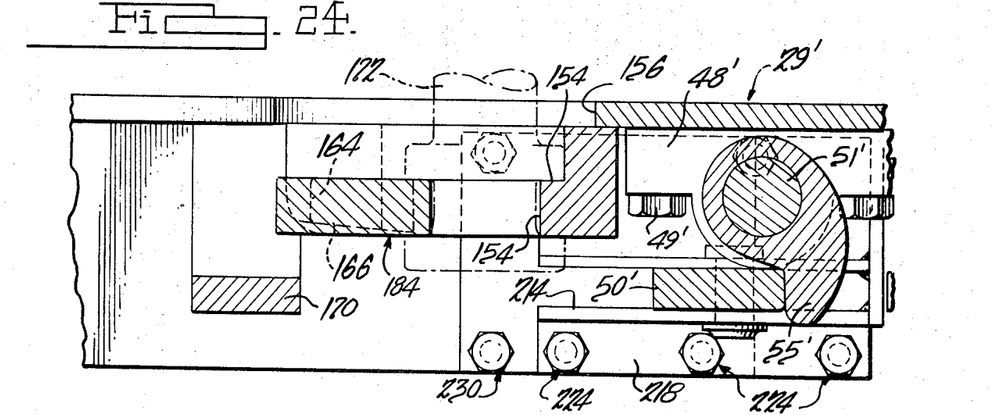
FIG. 24 is a sectional view taken substantially along line 24-24 of FIG. 23 looking in the direction of the arrows.

Support portion 150 includes tapered portions 160 and 162 as seen in FIG. 18 which guide the kingpin into the slot 152. A wall portion 164 of the slot tapers from the forward end thereof as seen in FIG. 18, and further as seen in FIG. 24, the undersurface 166 of portion 164 tapers upwardly in a forward direction. The construction of surfaces 164 and 166 enables the kingpin collar to be released earlier than with prior art constructions during a withdrawal operation thereby overcoming a tendency of the kingpin to bind in place when the kingpin is moving quite slowly out of the slot.

A reinforcing portion or member 170 is formed integrally with casting 150 and extends between opposite side thereof in spanning relationship to the entrance portion of the slot formed in the casting. This reinforcing member 170 is disposed substantially below the slot so as not to interfere with movement of the kingpin into and out of the slot, such kingpin being illustrated in phantom lines in the drawings and indicated by reference numeral 172.

Figure 20:
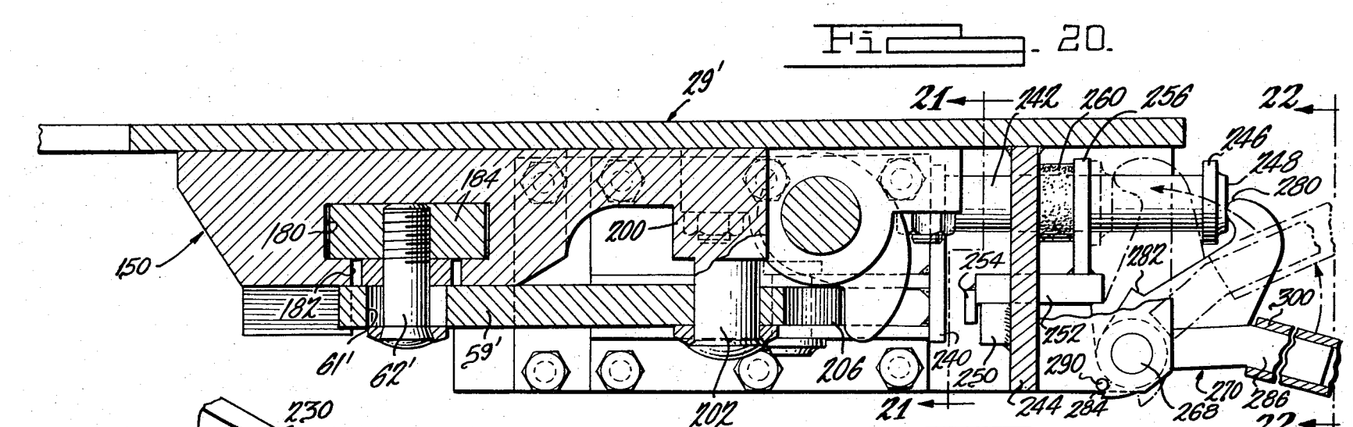
FIG. 20 is a sectional view taken substantially along line 20-20 of FIG. 18 looking in the direction of the arrows.

A slot 180 is formed laterally in one side of casting 150, this slot being seen most clearly in FIGS. 18 and 20. A cutout portion 182 is disposed immediately beneath slot 180 and in communication therewith. A kingpin locking bar 184 is slidably positioned within slot 180, this kingpin locking bar being connected by a pin 62' with an end portion of an arm 59' of bellcrank 47', pin 62' being slidable within a slot 61' disposed in the arm of the bellcrank.

As seen in FIG. 18, locking bar 184 includes a pair of cam surfaces 190 and 192 disposed on the forwardly facing surface thereof. Cam surface 190 is substantially aligned with the front sloping edge of the associated fifth wheel so that a kingpin entering the apparatus will not tend to bind on the locking bar. The cam surface 192 is engageable with the kingpin and causes the kingpin to cam the locking bar into retracted position as the kingpin enters the slot.

A pair of cam surfaces 194 and 196 are provided on the rearwardly facing surface of the locking bar. The cam surface 196 is at a very slight angle to the associated side of the locking bar and prevents the locking bar from binding with an associated kingpin when it is desired to retract the locking bar. The cam surface 194 of the locking bar is engaged by the kingpin when the locking bar is partially retracted as hereinafter described, whereby movement of the kingpin outwardly of the slot will cam the locking bar out of the way so that the kingpin may be removed from the slot.

Casting 150 includes an integral boss portion 200 having a pivot portion 202 extending downwardly therefrom, this pivot portion serving to pivotally support an intermediate part of bellcrank 47' which corresponds to the bellcrank 47 previously described. In this form of the invention, the arm 50' of the bellcrank includes an integral lateral extension 206 engageable with the cam arm 55'. This cam arm is connected to shaft 51' and an associated linkage similar to that previously described.

Figure 21:
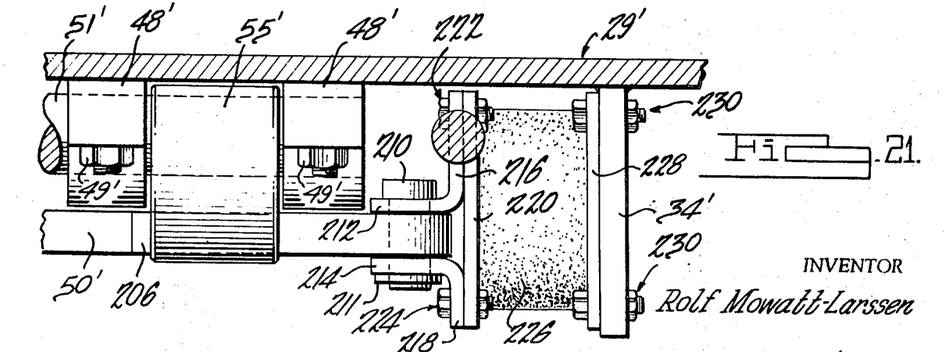
FIG. 21 is a sectional view taken substantially along line 21-21 of FIG. 20 looking in the direction of the arrows.
Figure 22:
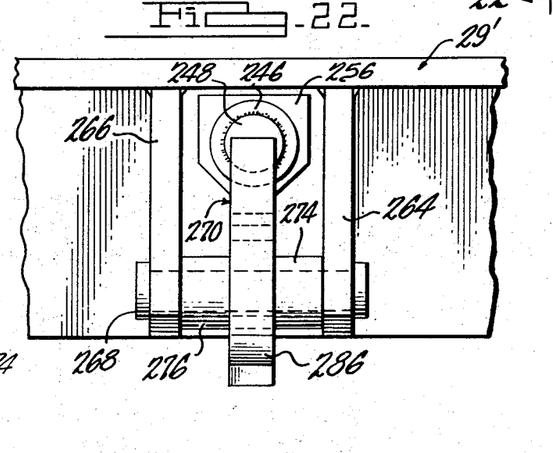
FIG. 22 is a view taken along line 22-22 of FIG. 20 looking in the direction of the arrows.
Figure 23:
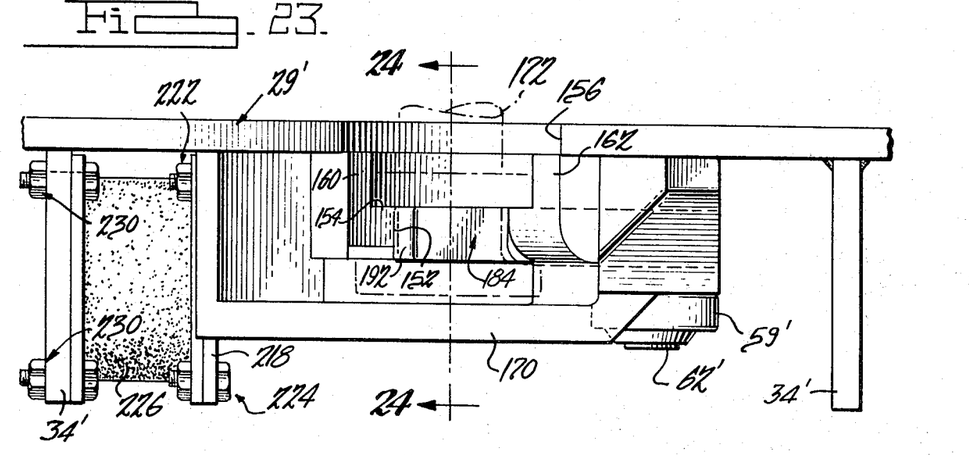
FIG. 23 is a front view partly broken away of the structure shown in FIG. 18.

As seen most clearly in FIG. 21, the outer end of arm 50' of the bellcrank is pivotally connected by means of pivot pin 210 with the generally horizontally disposed bracket portions 212 and 214, pin 210 extending through aligned holes provided in these members and suitably retained in operative position by a retainer member 211. Bracket portions 212 and 214 are interconnected with generally vertically extending bracket portions 216 and 218 respectively. The bracket portion 216 is in turn connected with a plate 220 by a plurality of spaced nut and bolt assemblies 222 extending through aligned holes provided in members 216 and 220. In a similar manner, the bracket portion 218 is connected with plate 220 by a plurality of nut and bolt assemblies 224 extending through aligned holes in these members.

A rubber shear pad 226 has one side thereof secured to a face plate 220, the opposite side of the pad being secured to the face of a plate 228. This plate 228 is in turn connected with the adjacent hanger 34', corresponding to the hanger 34 previously described, by means of a plurality of nut and bolt assemblies 230 extending through aligned holes provided in plate 228 and the hanger 34'.

The rubber shear pad 226 normally biases the components to the operative position shown in FIG. 18 wherein the kingpin locking bar is in its locked position. When the components are moved to the operative position shown in FIG. 19 wherein the kingpin locking bar has been partially retracted, the rubber shear pad 226 is in a stressed condition and will return the components to the position shown in FIG. 18 when the holding means hereinafter described is released.

Figure 25:
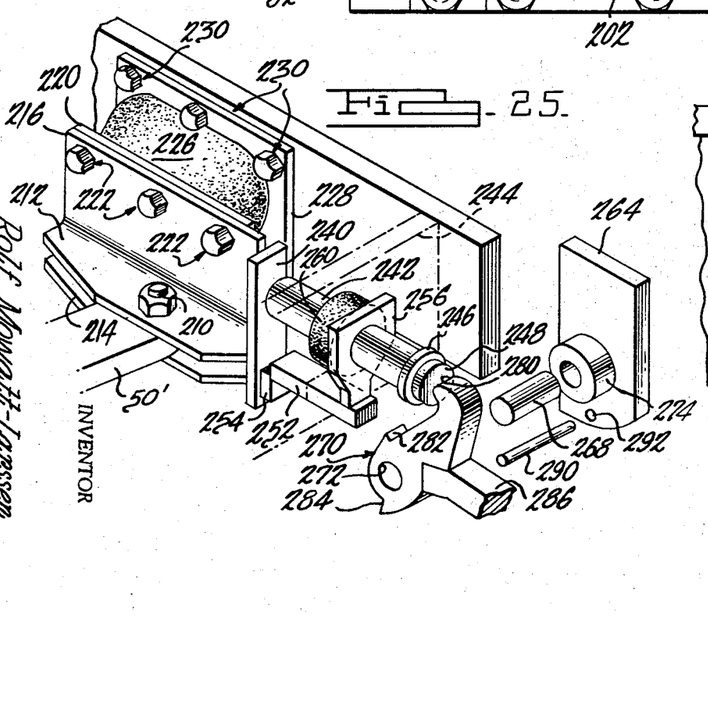
FIG. 25 is a top perspective view partly broken away illustrating a portion of the structure shown in FIG. 18.

As seen most clearly in FIGS. 18, 20 and 25, a plate 240 is secured as by welding to the bracket portions 216 and 218 previously described. A generally cylindrical member 242 is fixedly secured as by welding to plate 240 and is slidably supported within a suitable hole provided in a member 244 extending downwardly from the undersurface of the fifth wheel and having the opposite ends thereof rigidly affixed to hangers 34'. An annular member 246 is secured about member 242 adjacent the outer end 248 thereof.

A stop member 250 is secured to the forwardly facing surface of member 244. A holding means includes a horizontally disposed member 252 which is slidably supported within a suitable slot provided in member 244. A stop member 254 is rigidly affixed to the forwardly facing end of member 252, member 254 being engageable with the stop member 250 for limiting rearward movement of the holding means.

A platelike member 256 is rigidly secured at the lower end thereof to the member 252 of the holding means, the upper part of member 256 flaring outwardly as seen most clearly in FIG. 25. Resilient means in the form of an annular rubber member or the like 260 is interposed between members 256 and 244 to normally bias the holding means in a rearward direction, or to the right as seen in FIG. 20. Interengagement of members 250 and 254 will of course limit the rearward movement of the holding means, and member 260 is compressible upon forward movement of the holding means when manually actuated as hereinafter described.

A pair of ears 264 and 266 are secured to spaced portions of member 244, the ears being in substantially parallel relationship with one another and having aligned holes formed therein for receiving a pivot pin 268. The release member 270 as seen most clearly in FIG. 25 has a hole 272 formed therethrough receiving pivot pin 268. The release member is supported in operative relationship as seen in FIG. 18 wherein a pair of spacer members 274 and 276 are disposed about pin 268 and retain the release member 270 in the central relationship between ears 264 and 266 as illustrated.

The release member 270 includes an arcuate upper end portion 280 adapted to engage the outer end 248 of member 242 previously described. The release member also includes an integral holding shoulder 282 thereon for the purpose hereinafter described. A stop shoulder 284 is also formed integral with release member 270. Release member 270 additionally includes an offset portion 286 which may be of generally rectangular cross-sectional configuration.

A stop pin 290 as seen in FIG. 25 is received within aligned holes 292 formed in the ears 264 and 266, this stop pin being engageable with the stop shoulder 284 in the position shown in full lines in FIG. 20 for limiting the rearward movement of the release member.

The release means as described in connection with this latter modification of the invention is especially adapted for use when it is desired to unload a trailer with an overhead crane or the like. In such a case, it is desirable to move the kingpin locking bar 184 from the locked position shown in FIG. 18 to a partially retracted position shown in FIG. 19. When the locking bar has been moved into the position shown in FIG. 19, the trailer may be moved forward by an overhead crane, and interengagement of the kingpin with the cam surface 194 of the locking bar will urge the locking bar to its completely released position so that the kingpin and associated trailer may be moved away from the trailer hitch.

In order to manually operate the release means, a suitable tool is provided, an end of the tool being indicated by reference numeral 300 in FIG. 20. This tool may be of rigid tubular construction and has a recess therein complementary to the cross-sectional configuration of offset portion 286 of the release member 270. When the tool is disposed in the operative position as shown in FIG. 20, it is moved upwardly, thereby causing the release member to pivot in a counterclockwise direction from the full line position shown in FIG. 20 to the phantom line position shown in this FIG.

Figure 19:
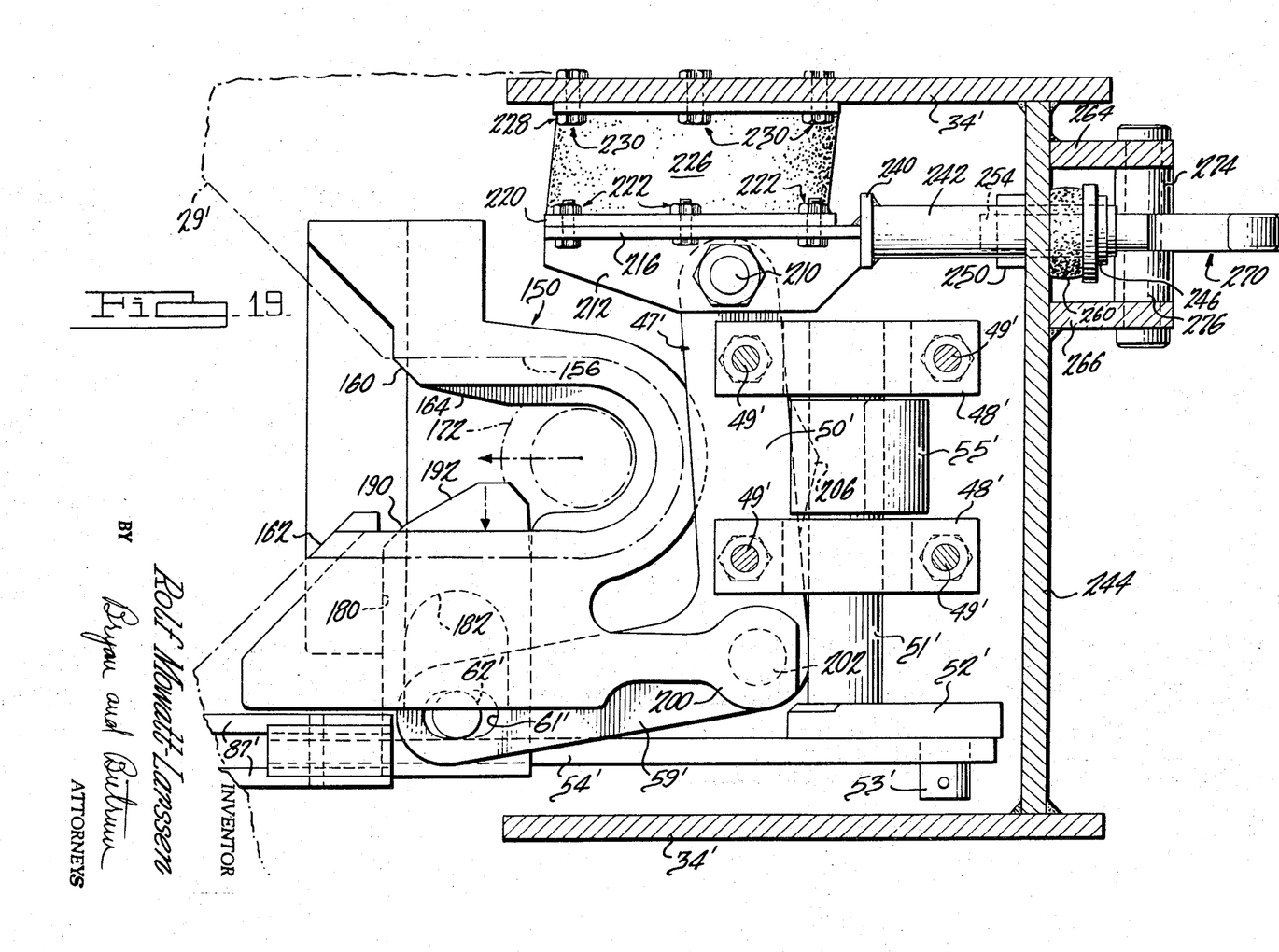
FIG. 19 is a view similar to FIG. 18 illustrating the components in a different operative position.

As the release member is pivoted as aforedescribed in a counterclockwise direction, member 242 is urged forwardly thereby causing the bellcrank 47' to be pivoted in a counterclockwise direction from the position seen in FIG. 18 into the operative position shown in FIG. 19 wherein the kingpin locking bar is partially retracted.

As the components move into the position shown in full lines in FIG. 19 and in phantom lines in FIG. 20, the portion of release member 270 having the holding shoulder 282 formed thereon engages the rearwardly facing surface to member 252 of the holding means and urges the holding means forwardly against the force of resilient means 260. When the release member has been moved into the phantom line position shown in FIG. 20, member 252 of the holding means is adapted to slide rearwardly under the influence of resilient means 260 so that the undersurface of member 252 engages the holding shoulder 282 of the release member thereby latching these members in this position. In other words, the release member cannot pivot clockwise once it is in this latching position until the holding means moves relative thereto, and the locking bar will be held in partially retracted position.

When an associated trailer is moved forwardly so that the kingpin thereof cams the locking bar to a completely retracted position, member 242 will be carried further forwardly from the full line position shown in FIG. 19. This additional forward movement of member 242 will cause the holding member 252 to move forwardly thereby allowing the release member 270 to pivot in a clockwise direction as seen in FIG. 20 under the influence of gravity.

When the kingpin has been removed from the slot 152, the rubber shear pad 226 will urge the components back into the full line position shown in FIG. 18, and the apparatus is ready for a subsequent cycle of operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. In a hitch, support means, front leg means, rear leg means, the upper ends of said leg means each being moveably connected to said support means, means for moveably supporting the lower ends of said leg means in spaced relationship, the rear leg means having upper and lower leg sections moveable interconnected with one another, means for collapsing said rear leg means rearwardly from said front leg means, said front leg means and said rear leg means being inclined toward one another and with respect to vertical when the hitch is in erected load supporting position, plate means pivotally connected to said front leg means, means for retaining said plate means in substantially horizontal position, a link system connected between said plate means and said support means and having a link extending substantially parallel with said front leg means for retaining said support means in substantially parallel relationship to said plate means in all positions of the apparatus, a kingpin locking bar moveably supported by said support means, said link system being operatively connected with said locking bar for moving the locking bar to retracted position, and actuating means moveably supported by said plate means for actuating said link system to retract said locking bar.

2. Apparatus as defined in claim 1 including latch means provided on one of the sections of said rear leg means for locking the sections of the rear leg means in aligned relationship, and means on said latch means engageable with said link system when retracting said kingpin locking bar for retracting said latch means and releasing the leg sections of said rear leg means.

3. Apparatus as defined in claim 2 including resilient means for moving said locking bar, said link system and actuating means to locked position.

4. Apparatus as defined in claim 1, wherein said support means has a slot therein for receiving a kingpin, said kingpin locking bar intercepting said slot and locking a kingpin therein, a member moveably supported by said support means and connected with said locking bar for operating the locking bar, resilient means operatively connected to said member for urging the member in a direction to move the locking bar into locked position, and means supported by said support means for engaging said member to move the member in a direction to move the locking bar into retracted position.

5. Apparatus as defined in claim 4 wherein said member comprises a bellcrank pivoted at an intermediate point thereof to said support means, one arm of said bellcrank being pivotally interconnected with said locking bar.

6. Apparatus as defined in claim 5 wherein said means engageable with the member for moving the locking bar into retracted position includes a cam arm, said cam arm being disposed on a shaft rotatably supported by said support means.

7. Apparatus as defined in claim 6, including an arm secured to said shaft, said link being pivotally interconnected with said arm for moving said arm to produce rotation of said shaft.

8. Apparatus as defined in claim 7, including means operatively connecting said actuating means with said link to cause rotation of said shaft when the actuating means is engaged by a tractor.